United States Patent
Kanevsky et al.

[11] Patent Number: 6,161,090
[45] Date of Patent: *Dec. 12, 2000

[54] APPARATUS AND METHODS FOR SPEAKER VERIFICATION/IDENTIFICATION/CLASSIFICATION EMPLOYING NON-ACOUSTIC AND/OR ACOUSTIC MODELS AND DATABASES

[75] Inventors: Dimitri Kanevsky, Ossining, N.Y.; Stephane Herman Maes, Danbury, Conn.

[73] Assignee: International Business Machines Corporation, Armonk, N.Y.

[*] Notice: This patent is subject to a terminal disclaimer.

[21] Appl. No.: 09/275,592

[22] Filed: Mar. 24, 1999

Related U.S. Application Data

[63] Continuation of application No. 08/871,784, Jun. 11, 1997, Pat. No. 5,897,616.

[51] Int. Cl.[7] ............................. G10L 17/00; G10L 15/00
[52] U.S. Cl. ..................... 704/246; 704/247; 704/273; 704/275
[58] Field of Search ................................. 704/270, 275, 704/246, 247; 379/88

[56] References Cited

U.S. PATENT DOCUMENTS 5,897,616   4/1999   Kanevsky et al. ................. 704/246

*Primary Examiner*—David R. Hudspeth
*Assistant Examiner*—Susan Wieland
*Attorney, Agent, or Firm*—F. Chau & Associates, LLP

[57] ABSTRACT

A method of controlling access of a speaker to one of a service and a facility, the method comprising the steps of: (a) receiving first spoken utterances of the speaker, the first spoken utterances containing indicia of the speaker; (b) decoding the first spoken utterances; (c) accessing a database corresponding to the decoded first spoken utterances, the database containing information attributable to a speaker candidate having indicia substantially similar to the speaker; (d) querying the speaker with at least one question based on the information contained in the accessed database; (e) receiving second spoken utterances of the speaker, the second spoken utterances being representative of at least one answer to the at least one question; (f) decoding the second spoken utterances; (g) verifying the accuracy of the decoded answer against the information contained in the accessed database serving as the basis for the question; (h) taking a voice sample from the utterances of the speaker and processing the voice sample against an acoustic model attributable to the speaker candidate; (i) generating a score corresponding to the accuracy of the decoded answer and the closeness of the match between the voice sample and the model; and (j) comparing the score to a predetermined threshold value and if the score is one of substantially equivalent to and above the threshold value, then permitting speaker access to one of the service and the facility.

39 Claims, 5 Drawing Sheets

APPARATUS AND METHODS FOR SPEAKER VERIFICATION/IDENTIFICATION/ CLASSIFICATION EMPLOYING NON-ACOUSTIC AND/OR ACOUSTIC MODELS AND DATABASES

This appln is a cont of Ser. No. 08/871,784 filed Jun. 11, 1997, U.S. Pat. No. 5,897,616.

RELATED APPLICATION DATA

This application is related to the application (Docket Number Y0997-136) entitled "Portable Acoustic Interface For Remote Access To Automatic Speech/Speaker Recognition Server", which is commonly assigned and is filed concurrently with the present invention.

BACKGROUND OF THE INVENTION

The present invention relates to methods and apparatus for providing security with respect to user access of services and/or facilities and, more particularly, to methods and apparatus for providing same employing automatic speech recognition, text-independent speaker identification, natural language understanding techniques and additional dynamic and static features.

In many instances, it is necessary to verify that an individual requesting access to a service or a facility is in fact authorized to access the service or facility. For example, such services may include banking services, telephone services, or home video provision services, while the facilities may be, for example, banks, computer systems, or database systems. In such situations, users typically have to write down, type or key in (e.g., on a keyboard) certain information in order to send an order, make a request, obtain a service, perform a transaction or transmit a message.

Verification or authentication of a customer prior to obtaining access to such services or facilities typically relies essentially on the customer's knowledge of passwords or personal identification numbers (PINs) or by the customer interfacing with a remote operator who verifies the customer's knowledge of information such as name, address, social security number, city or date of birth, mother's maiden name, etc. In some special transactions, handwriting recognition or signature verification is also used.

However, such conventional user verification techniques present many drawbacks. First, information typically used to verify a user's identity may be easily obtained. Any perpetrator who is reasonably prepared to commit fraud usually finds it easy to obtain such personal information such as a social security number, mother's maiden name or date of birth of his intended target. Regarding security measures for more complex knowledge-based systems which require passwords, PINs or knowledge of the last transaction/ message provided during the previous service, such measures are also not reliable mainly because the user is usually unable to remember this information or because many users write the information down thus making the fraudulent perpetrator's job even easier. For instance, it is known that the many unwitting users actually write their PINs on the back of their ATM or smart card.

The shortcomings inherent with the above-discussed security measures have prompted an increasing interest in biometric security technology, i.e., verifying a person's identity by personal biological characteristics. Several biometric approaches are known. However, one disadvantage of biometric approaches, with the exception of voice-based verification, is that they are expensive and cumbersome to implement. This is particularly true for security measures involved in remote transactions, such as internet-based or telephone-based transaction systems.

Voice-based verification systems are especially useful when it is necessary to identify a user who is requesting telephone access to a service/facility but whose telephone is not equipped with the particular pushbutton capability that would allow him to electronically send his identification password. Such existing systems which employ voice-based verification utilize only the acoustic characteristics of the utterances spoken by the user. As a result, existing voice identification methods, e.g., such as is disclosed in the article: S. Furui, "An Overview of Speaker Recognition", Automatic Speech and Speaker Recognition, Advanced Topics, Kluwer Academic Publisher, edited by C. Lee, F. Soong and K. Paliwal, cannot guarantee a reasonably accurate or fast identification particularly when the user is calling from a noisy environment or when the user must be identified from among a very large database of speakers (e.g., several million voters). Further, such existing systems are often unable to attain the level of security expected by most service providers. Still further, even when existing voice verification techniques are applied under constrained conditions, whenever the constraints are modified as is required from time to time, verification accuracy becomes unpredictable. Indeed, at the stage of development of the prior art, it is clear that the understanding of the properties of voice prints over large populations, especially over telephone (i.e., land or cellular, analog or digital, with or without speakerphones, with or without background noise, etc.), is not fully mastered.

Furthermore, most of the existing voice verification systems are text-dependent or text-prompted which means that the system knows the script of the utterance repeated by the user once the identify claim is made. In fact in some systems, the identity claim is often itself part of the tested utterance; however, this does not change in any significant way the limitations of the conventional approaches. For example, a text-dependent system cannot prevent an intruder from using a pre-recorded tape with a particular speaker's answers recorded thereon in order to breach the system.

Text-independent speaker recognition, as the technology used in the embodiments presented in the disclosure of U.S. Ser. No. 08/788,471, overcomes many disadvantages of the text-dependent speaker recognition approach discussed above. But there are still several issues which exist with respect to text-independent speaker recognition, in and of itself. In many applications, text-independent speaker recognition requires a fast and accurate identification of the identity of a user from among a large number of other prospective users. This problem is especially acute when thousands of users must be processed simultaneously within a short time period and their identities have to be verified from a database that stores millions of user's prototype voices.

In order to restrict the number of prospective users to be considered by a speech recognition device and to speed up the recognition process, it has been suggested to use a "fast match" technique on a speaker, as disclosed in the patent application (IBM Docket No. Y0996-189) entitled, "Speaker Recognition Over Large Population with Combined Fast and Detailed Matches", filed on May 6, 1997. While this procedure is significantly faster than a "detailed match" speaker recognition technique, it still requires processing of acoustic prototypes for each user in a database. Such a procedure can still be relatively time consuming and may generate a large list of candidate speakers that are too extensive to be processed by the recognition device.

Accordingly, among other things, it would be advantageous to utilize a language model factor similar to what is used in a speech recognition environment, such factor serving to significantly reduce the size of fast match lists and speed up the procedure for selecting candidate speakers (users) from a database. By way of analogy, a fast match technique employed in the speech recognition environment is disclosed in the article by L. R. Bahl et al., "A Fast Approximate Acoustic Match for Large Vocabulary Speech Recognition", IEEE Trans. Speech and Audio Proc., Vol. 1, pg. 59–67 (1993).

SUMMARY OF THE INVENTION

It is an object of the present invention to provide methods and apparatus for providing secure access to services and/or facilities which preferably utilize random questioning, automatic speech recognition (ASR) and text-independent speaker recognition techniques. Also, indicia contained in spoken utterances provided by the speaker may serve as additional information about the speaker which may be used throughout a variety of steps of the invention.

In one aspect of the present invention, a method of controlling access of a speaker to one of a service and a facility comprises the steps of: (a) receiving first spoken utterances of the speaker, the first spoken utterances containing indicia of the speaker; (b) decoding the first spoken utterances; (c) accessing a database corresponding to the decoded first spoken utterances, the database containing information attributable to a speaker candidate having indicia substantially similar to the speaker; (d) querying the speaker with at least one random (but questions could be non-random) question (but preferably more than one random question) based on the information contained in the accessed database; (e) receiving second spoken utterances of the speaker, the second spoken utterances being representative of at least one answer to the at least one random question; (f) decoding the second spoken utterances; (g) verifying the accuracy of the decoded answer against the information contained in the accessed database serving as the basis for the question; (h) taking a voice sample from the utterances of the speaker and processing the voice sample against an acoustic model attributable to the speaker candidate; (i) generating a score corresponding to the accuracy of the decoded answer and the closeness of the match between the voice sample and the model; and (j) comparing the score to a predetermined threshold value and if the score is one of substantially equivalent to and above the threshold value, then permitting speaker access to one of the service and the facility. If the score does not fall within the above preferred range, then access may be denied to the speaker, the process may be repeated in order to obtain a new score, or a system provider may decide on another appropriate course of action.

In a first embodiment, the indicia may include identifying indicia, such as a name, address, customer number, etc., from which the identity claim may be made. However, in another embodiment, the identity claim may have already been made by the potential user keying in (or card swiping) a customer number or social security number, for example, in which case the indicia includes verifying indicia in order to aid in the verification of the identity claim. Also, the indicia may serve as additional information about the user which may serve as static and/or dynamic parameters in building or updating the user's acoustic model.

In another aspect of the present invention, a method of controlling access of a speaker to one of a service and a facility from among a multiplicity of speaker candidates comprises the steps of: (a) receiving first spoken utterances of the speaker, the first spoken utterances containing indicia of the speaker; (b) decoding the first spoken utterances; (c) generating a sub-list of speaker candidates that substantially match the speakers decoded spoken utterances; (d) activating databases respectively corresponding to the speaker candidates in the sub-list, the databases containing information respectively attributable to the speaker candidates; (e) performing a voice classification analysis on voice characteristics of the speaker; (f) eliminating speaker candidates who do not substantially match these characteristics; (g) querying the speaker with at least one question that is relevant to the information in the databases of speaker candidates remaining after the step (f); (h) further eliminating speaker candidates based on the accuracy of the answer provided by the speaker in response to the at least one question; (i) further performing the voice classification analysis on the voice characteristics from the answer provided by the speaker; (j) still further eliminating speaker candidates who do not substantially match these characteristics; and (k) iteratively repeating steps (g) through (j) until one of one speaker candidate and no speaker candidates remain, if one speaker candidate remains then permitting the speaker access and if no speaker candidate remains then denying the speaker access. Of course, it is possible to repeat the entire process if no speaker candidate is chosen or a system provider may choose another appropriate course of action.

Again, as mentioned above, the method of the invention may be used for identification and/or verification without any explicit identification given by the user (e.g., name). By checking the type of request made by the user, using additional information, if provided, and by using the acoustic match, discussed above, user identification may be established. Further, by using the random questions in addition to the acoustic identification, a more accurate identification is achieved in almost any type of environment.

It is therefore an object of the invention to provide apparatus and methods which: use external information to build user's models; extract non-feature-based information from the acoustic properties of the speech to build user's models; extract non-acoustic information from the speech to build user's models; drives the conversations to request specific information; decodes and understands the answers to these questions; compares the answers to information stored in a database; and build user's model on answers to the questions.

The resulting system is a combination of technology: text-independent speaker recognition, speech recognition and natural language understanding. It is also possible to add new questions, decode and understand the answer and add this question in the pool of the random questions for next access request by the same user.

It is also to be appreciated that the methods and apparatus described herein use voice prints (speaker recognition), speech recognition, natural language understanding, acoustic and content analysis to build a new biometric. Such a speech biometric contains acoustic information, semantic information, static and dynamic information, as will be explained, and is also a knowledge based system. However, while the invention utilizes knowledge known by the user and knowledge acquired by the speech recognition engine (e.g., speech rate, accent, preferred vocabulary, preferred requests), the combination thereof provides advantages much greater than the advantages respectively associated with each individual aspect. Such a formation of this unique speech biometric including voice prints and knowledge based systems has, prior to this invention, been unknown since the two concepts have previously been considered substantially mutually exclusive concepts.

The overall system provides a security level with an arbitrary level of security with speech and speaker recognition technology and natural language understanding. This global architecture has the advantage of being universal and adaptable to substantially any situation. The complete transaction is monitored so that possible problems can be detected in using this large amount of data and flags are raised for further processing for action by the service provider.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
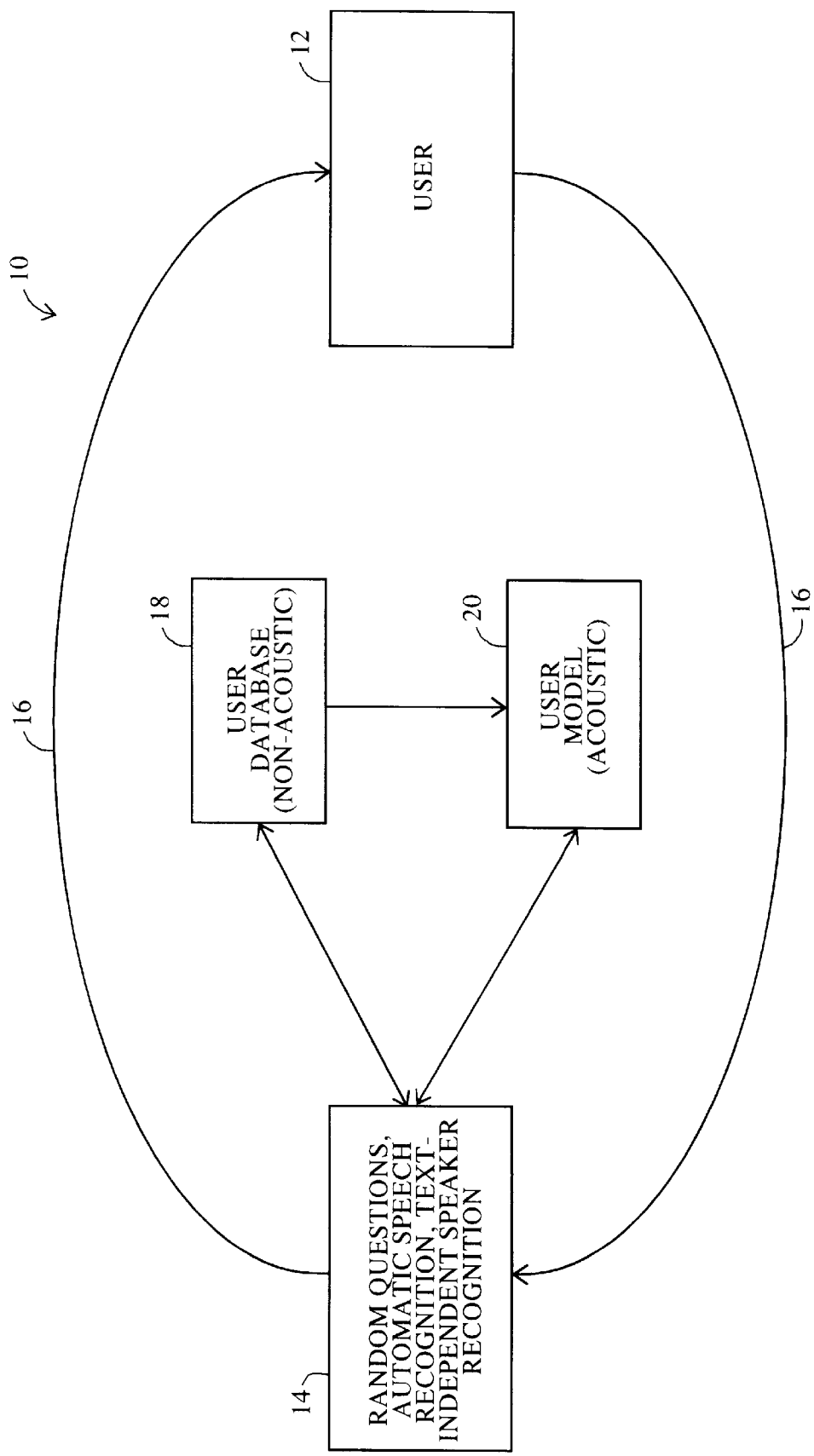
FIG. 1 is a flow chart/block diagram illustrating the functional interconnection between components of the invention.

Referring initially to FIG. 1, a flow chart/block diagram of the basic components of the invention is shown. The invention employs a unique combination of random questions, automatic speech recognition (ASR) and text-independent speaker recognition to provide a significant improvement in secure access to services and/or facilities (as discussed previously) requiring security measures. Specifically, a user (block 12) requesting access to a service/facility is subjected to a security system 10 employing a combination of random questions, ASR and text-independent speaker recognition (block 14) via an iterative process (loop 16) whereby the security system 10 utilizes user databases of non-acoustic information (block 18) and/or an acoustic user model (block 20) to perform the verification/identification of the user 12. These components and their specific interaction will be explained below in the context of the remaining figures.

It is to be understood that the components described herein in accordance with the invention may be implemented in hardware, software, or a combination thereof. Preferably, the invention is implemented in software in the form of functional software modules on an appropriately programmed general purpose digital computer or computers. The actual location of the computer system implementing, the invention is not critical to the invention; however, in an application where the user is requesting remote access via telephone, the invention or portions thereof may reside at the service/facility location or some location remote thereto. Further, the invention may be implemented in an internet environment in which case various portions of the invention may reside at the user's location and/or the service providers location.

Figure 2:
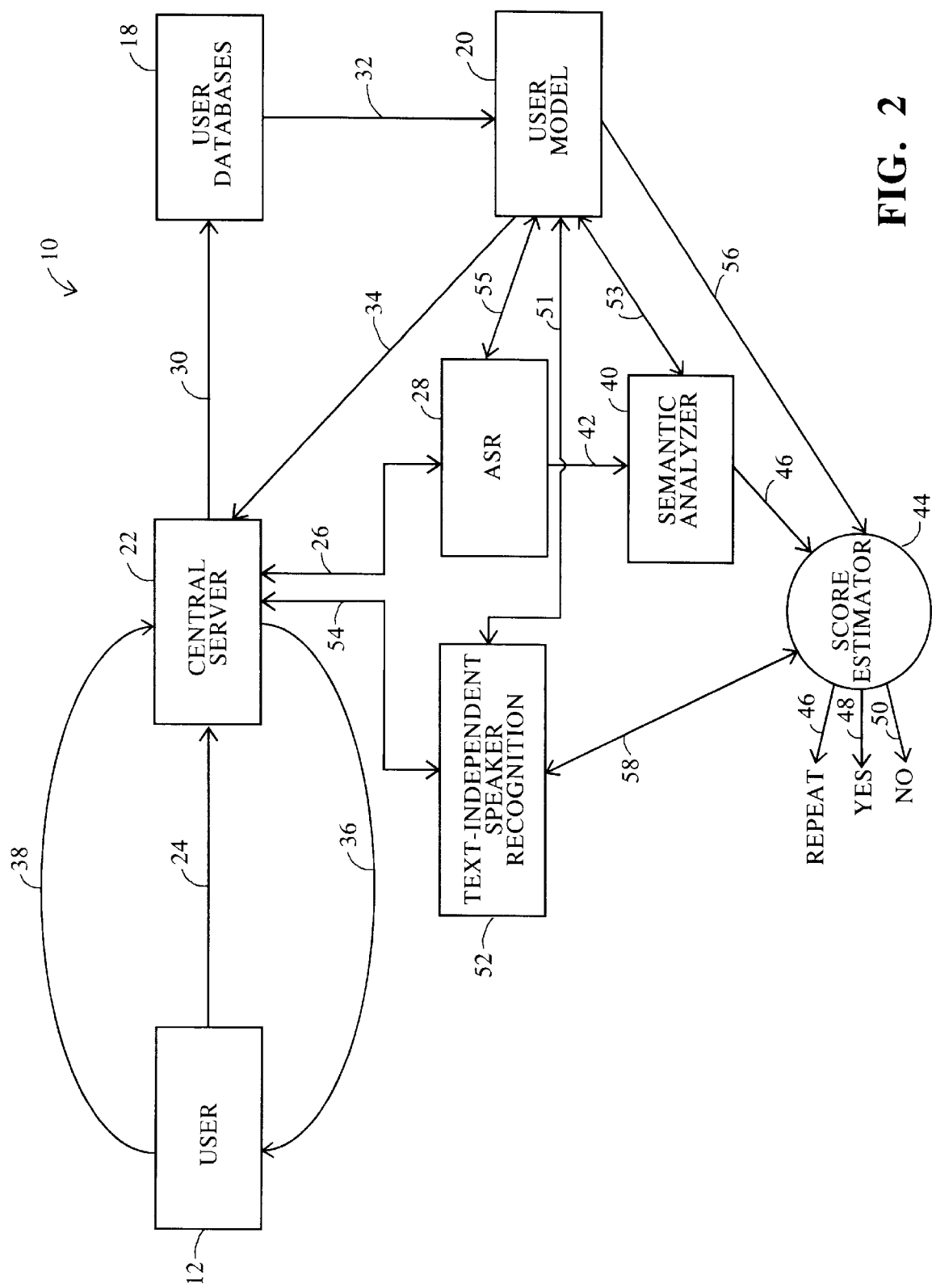
FIG. 2 is a flow chart/block diagram further illustrating components of the invention.

Referring now to FIG. 2, one embodiment of the invention, illustrated via a flow chart/block diagram, is shown. It is to be understood that same or similar components illustrated throughout the figures are designated with the same reference numeral. A potential user 12 of the service/facility performs the following operation in cooperation with security system 10 in order to gain access to the service/facility. The user 12 calls a central server 22 via link 24. The user 12 identifies himself via his name, for example, and requests access to the service/facility. The central server 22 then performs the following operations. The server 22 submits the utterance of the user's name and request to automatic speech recognizer (ASR) 28 via link 26 which decodes the utterance and submits the decoded name and request back to server 22. It is to be appreciated that, while preferable, the name of the speaker is not mandatory in establishing the identity claim. The identity claim may be made from other information provided by the speaker or voice characteristics, as explained herein. Also, the identity claim may be established by the user keying in or using a magnetic strip card to provide an identification number. The server 22 then accesses a database (which is part of the user databases 18) via link 30 corresponding to the user (candidate) identified during the identification claim. As will be explained, the user database contains information specific to that particular user. Also, an acoustic model 20 pertaining to that user (as will be explained) is selected from the user's database through link 32 and provided to the central server 22 via link 34.

Next, utilizing the specific information from the identified user's database, the server 22 generates a random question (or multiple random questions) for the user via link 36. The user answers the random question(s) which is sent back to the server 22 via link 38. It should be understood that links 24, 36 and 38 are preferably provided over a single communication path which may be hardwired (e.g. PSTN) or wireless (e.g. cellular). The separation of links is meant to illustrate functionality rather than physical implementation.

The central server 22 receives the user's answer and processes it through ASR 28. After decoding the answer, ASR 28 passes the decoded answer to a semantic analyzer 40 via link 42. The semantic analyzer 40 analyzes the answer to determine if the answer is correct, or not, in accordance with the information in the user's database. The result of the semantic analyzer 40 is sent to a score estimator 44 via link 46 where a partial score associated with the answer received from the user is generated. It should be understood that the lack of a "perfect" partial score does not necessarily indicate an incorrect answer from the user due to the fact that known speech recognition processes, such as employed by ASR 28, have acceptable recognition error rates associated therewith and, thus, while the actual answer is correct, the decoded answer may be close enough to satisfy the semantic analyzer 40. Also, it is to be understood that some speech recognition and natural language understanding techniques may have recognition and/or understanding errors associated therewith such that, as a result, they do not correctly recognize and/or understand the answer provided by the speaker. Hence, in such cases, it is preferred that more than one random question be asked prior to making a decision to permit or deny access to the speaker. Links 46, 48 and 50 from the score estimator 44 go back to the central server 22 to indicate whether the answer was correct, not correct, or for some reason (e.g., ASR could not properly decode the response), the answer was not understood and the answer should be repeated by the user 12. The question and answer process between the user 12 and the central server 22 may continue for as many iterations as are desired to substantially ensure that the potential user is the user associated with the subject user database.

Substantially simultaneous with the spoken utterances provided by the user 12, the central server 22 may process a user voice sample, for example, from the initial dialog from the potential user and/or from the answer or answers uttered by the potential user, through a text-independent speaker recognition module 52 via link 54 in order to verify (confirm) the user's identity. The module 52 utilizes the user model previously built (as will be explained in the context of FIG. 5) and which is presented to module 52 from user model 20 via link 51. It is to be appreciated that such speaker recognition process of module 52 is preferably implemented by default, regardless of the partial score(s) achieved in the question/answer phase, in order to provide an additional measure of security with regard to service/facility access. The voice sample is processed against the user model and another partial score is generated by the score estimator 44. Based on a comparison of a combination of the partial scores (from the question/answer phase and the background speaker verification provided by module 52) versus a predetermined threshold value, the central server 22 decides whether or not to permit access to the service/facility to the user 12. If the combined score is above or within an acceptable predetermined range of the threshold value, the central server 22 may permit access, else the server may decide to deny access completely or merely repeat the process. Further, a service provider may decide to take other appropriate security actions.

The user model 20 may also be operatively coupled to the central server 22 (link 34), the semantic analyzer 40 (link 53), the score estimator 44 (link 56) and the ASR 28 (link 55) in order to provide a data path therebetween for the processes, to be further explained, performed by each module. Link 58 between the text-independent speaker recognition module 52 and the score estimator 44 is preferably provided in order to permit the module 52 to report the results of the voice sample/model comparison to the estimator 44.

Also, it is to be understood that because the components of the invention described herein are preferably implemented as software modules, the actual links shown in the figures may differ depending on the manner in which the invention is programmed.

It is to be appreciated that portions of the information in each database and the user models may be built by a pre-enrollment process. This may be accomplished in a variety of ways. The speaker may call into the system and, after making an identity claim, the system asks questions and uses the answers to build acoustic and non-acoustic models and to improve the models throughout the entire interaction and during future interactions. Also, the user may provide information in advance (pre-enrollment) through processes such as mailing back a completed informational form with similar questions as asked during enrollment over the phone. Then, an operator manually inputs the information specific to the user into the system. Alternatively, the user may interact with a human operator who asks questions and then inputs answers to questions into the system. Still further, the user may complete a web (internet) question/answer form, or use e-mail, or answer questions from an IVR (Integrated Voice Response) system. Also, it is to be appreciated that the questions may preferably be relatively simple (e.g., what is your favorite color?) or more complex, depending on the application. The simpler the question, the more likely it is that the actual user will not be denied access simply because he forgot his answers.

Furthermore, because of the fact that text-independent speaker recognition is performed in the background and the questions are random in nature and the entire process is monitored throughout the dialog, even frauders using tape recorders or speech synthesizers cannot fool the system of the invention as such fraudulent processes cannot handle the random questions and/or the dialog in real-time. Still further, for a frauder to know the answers to all the questions will not help gain access to the service or facility, since if the frauder has a different speech rate or voice print, for example, then the identification and verification claim will fail. For these reasons, the actual user is encouraged to answer with a natural full sentence, that is, to establish a full dialog.

It is further to be understood that the system of the invention is capable of building more questions, either by learning about the user or, after identifying the user, asking new questions and using the answers (which are transcribed and understood) as the expected answers to future random questions.

Accordingly, it is to be appreciated that the invention can build databases and models both automatically and manually. Automatic enrollment is performed by obtaining the name, address and whatever other identification tag that the service/facility desires and then building, from scratch, models and compiling data usable for future identification or verification. Beyond the ability to self-enroll users, the system of the invention provides the ability to automatically adapt, improve or modify its authentication processes. Still further, the automatic nature of the invention permits the building of a user profile for any purpose including the possibility of having other self-enrolling, self-validating and/or self-updating biometrics (e.g., face patterns for face recognition, iris recognition, etc.). Thus, it is possible to combine biometrics (speech, voiceprint) in order to have self-enrolling biometrics. Self-validation is also provided such that whenever a score associated with the biometric match is poor, the present invention may be used to still admit the person but also to correct the models on the assumption that they are outdated.

It is to be appreciated that several variations to the above-described security access process are possible. For example, if a caller calls the central server 22 for the first time and the system has a database of information pertaining to the caller but does not have an acoustic model set up for that caller, the following procedure may be performed. The central server 22 asks a plurality of questions from the database, the number of questions depending upon the known average error rate associated with ASR 28 and semantic analyzer 40. Then, based only on the scores achieved by the answers received to the questions, the server 22 makes a determination whether or not to permit access to the caller. However, the system collects voice samples from the caller's answers to the plurality of questions and builds a user voice model (e.g., user model 20) therefrom. Accordingly, the next time the caller calls, the server 22 need ask only a few random questions from the database and, in addition, use the text-independent speaker recognition module 52 along with the new user model to verify his identity, as explained above.

Many ways for communicating the random questions to the user may be envisioned by one of ordinary skill in the art. For instance, if the user is attempting to access the service/facility through a web page, the questions may be presented in text form. If access is attempted over a telephone line, the questions may be asked via a voice synthesizer, a pre-recorded tape or a human operator. The actual method of asking the questions is not critical to the invention. Alternatively, it is to be appreciated that at least a portion of the answers provided by the potential user may be in a form other than speech, i.e., text format, keyed-in information, etc.

A further variation to the above-described system includes an embodiment wherein the inventive security system is implemented in a user's personal computer (at his home or office) to which the user seeks access. In such a scenario, a module substantially equivalent to the central server module may use such information as the last time the user received a facsimile on the computer, etc., to decide whether or not to allow access. Specifically, an ASR/semantic analyzer and/or a speaker recognition module, such as those discussed above, may be implemented in the user's computer to perform the verification process discussed herein. One of ordinary skill in the art will appreciate further variations to the above-described embodiments given the inventive teachings disclosed herein.

Figure 3:
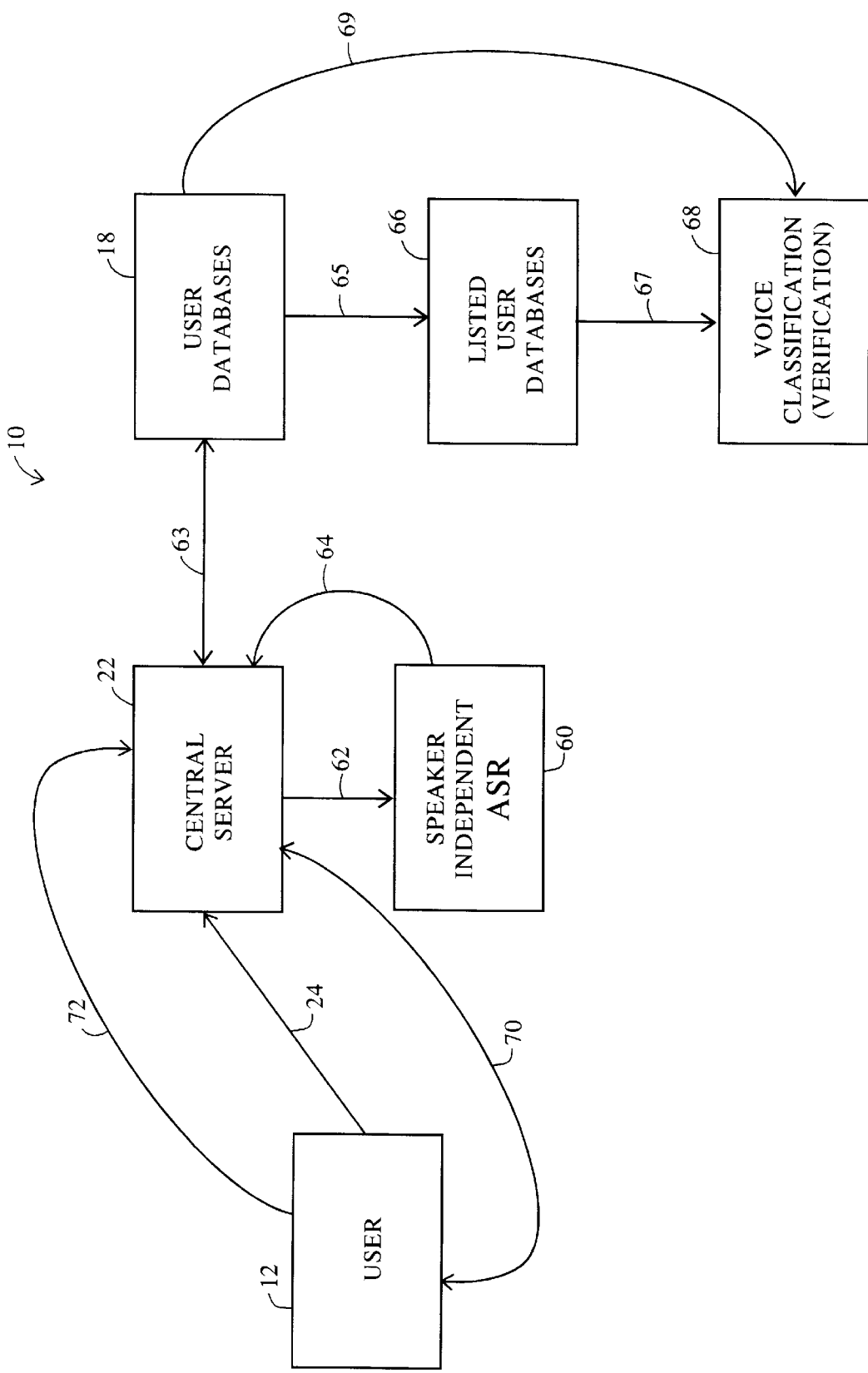
FIG. 3 is a flow chart/block diagram illustrating an iterative procedure performed according to the invention.

Referring now to FIG. 3, another embodiment of the invention, illustrated via a flow chart/block diagram, is shown. Such an embodiment provides a security system for processing a large number of users who are attempting to access a service/facility simultaneously or for processing a large user database. Specifically, the embodiment described below provides identification in a verification process with respect to a speaker via an iterative procedure that reduces a set of candidate speakers at each step via random questioning and voice identification on such set of candidate speakers until one candidate or no candidates are left.

Again, a potential user 12 calls a central server 22 via link 24, identifies himself and requests access to the particular service/facility. Next, the server 22 provides the name of the user to a speaker-independent ASR 60 via link 62. In response, the ASR 60 decodes the caller's name and provides a list of candidate names that match the caller's acoustic utterance to the server 22 via link 64. However, as mentioned above, even if the speaker doesn't provide his/her name, the system may use other information and voice characteristics to generate the list of candidates.

Next, personal databases (block 66) of users with names from the list are activated. These databases are activated through the larger set of databases 18 of all the service/facility users via links 63 and 65. The selected databases contain personal user data, such as age, profession, family status, etc., as well as information about the user's voice, such as prototypes, prosody, speech rate, accent, etc. The types of information in the databases will be described later in greater detail.

Still further, a voice classification module 68 is accessed via link 69. The module 68, which performs a voice classification analysis, checks for certain voice characteristics of the caller and browses the selected databases 66 via link 67 to eliminate users who do not fit these characteristics, thus narrowing the list of possible candidates. Next, a random question relevant to the user databases that remain as candidates after the voice classification analysis is presented to the user via link 70. The user provides his answer to the question via link 72 and the server 22, via the ASR 60, uses the answer to eliminate more of the candidates. Further, the server 22 uses the user's voice sample from the answer to run a more precise voice classification analysis via module 68 to reduce the list of candidates even further. This procedure continues iteratively with more random questions and with more detailed levels of speaker classification analysis until one or none of the candidates remain. As mentioned, the use of random questions in an iterative process makes the fraudulent use of recorders or synthesizers to fool the system substantially useless. Also, the use of a relatively large quantity of random questions overcomes the known problem of speech recognition and natural language understanding techniques making recognition and understanding errors.

A variation to the above embodiment includes the scenario wherein the user 12 provides a password to the server 22 which he shares with a group of other users. In this way, the server 22 initially narrows the possible candidate databases from the set of databases 18 before asking any questions or accessing the voice classification module 68. Once the list of user databases are limited by the password, then the above iterative process may be performed to identify one of the candidates or to exclude all candidates.

As mentioned previously, while multiple links between modules are illustrated in the figures, they are meant to illustrate functional interaction between modules rather than actual physical interconnection, although a physical implementation similar thereto may be employed. Also, one of ordinary skill in the art will appreciate further variations to the above-described embodiments given the inventive teachings disclosed herein.

Figure 4:
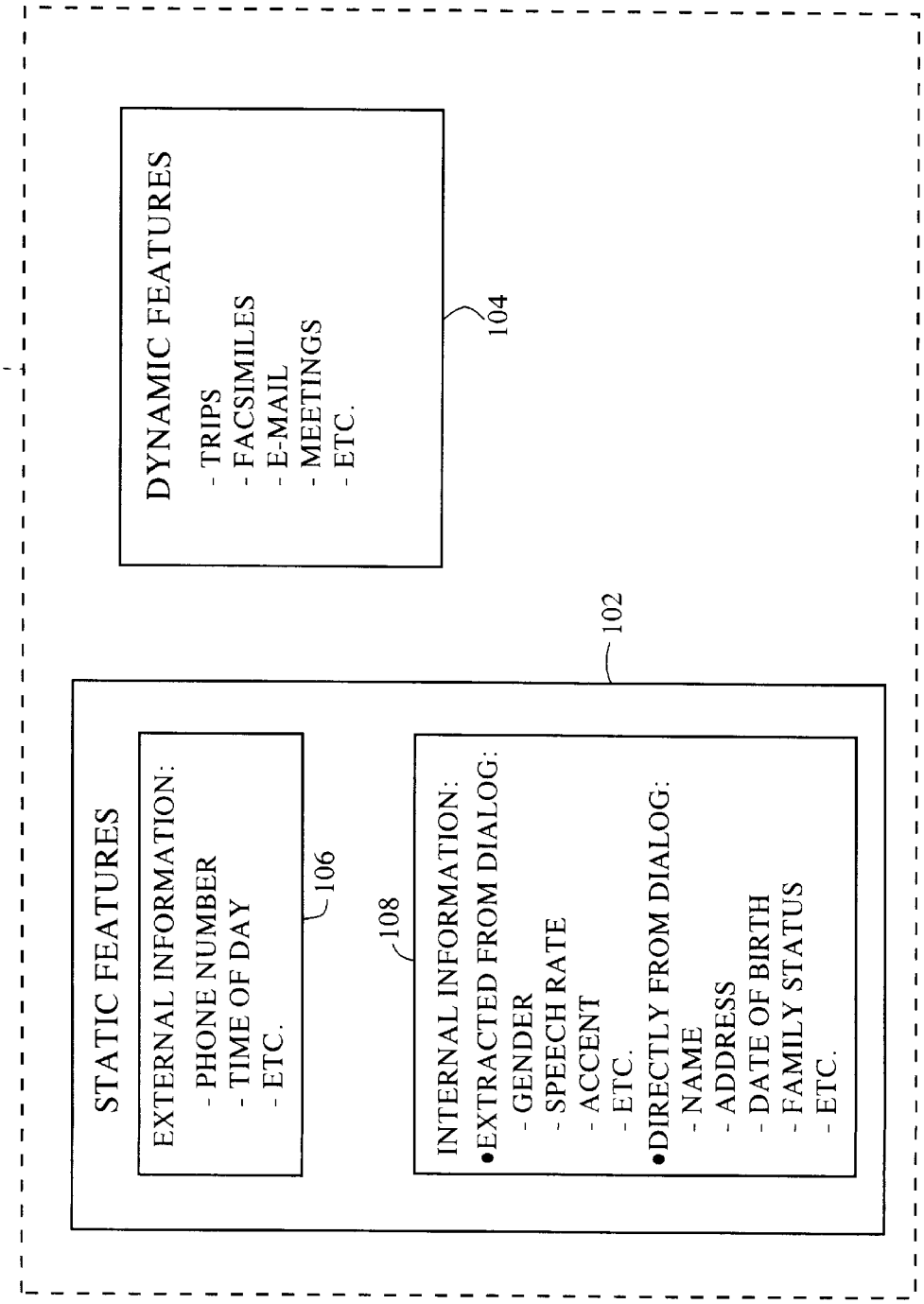
FIG. 4 is a block diagram illustrating a user database according to the invention.

Referring now to FIG. 4, a block diagram illustrating the possible types of information contained in a user database 18 is shown. The use of such non-acoustic information, as previously explained, significantly improves the performance of the security measures described with respect to the invention. In addition, a variety of acoustic information may be included in the databases.

The information may be categorized as information exhibiting static features, i.e. information that does not change or changes slowly or periodically with time (block 102), and information exhibiting dynamic features, i.e., information that changes quickly or non-periodically with time (block 104). In other words, static information is a function of the caller/user and dynamic information is a function of the request. Static information may be either internal (block 106) or external (block 108). Examples of external information are phone numbers, time of day, etc. Internal information may be further categorized as information extracted from the dialog between the user and the server, such as gender, speech rate, accent, etc., or information decoded from the dialog by the ASR, such as name, address, date of birth, family status, etc. On the other hand, dynamic information may include information regarding the caller's trips, meetings with people, facsimile and e-mail information. For instance, if the system of the invention is implemented on the user's computer, as previously mentioned, then the system may query the user who is seeking remote access thereto by asking whether the user received e-mail from a particular person on a particular day. It is to be appreciated that the present invention can dynamically create new questions (from information provided in real-time), understand the respective answers and then use the information during the next transaction. Automatic enrollment of a new user may also be accomplished in a similar manner.

Figure 5:
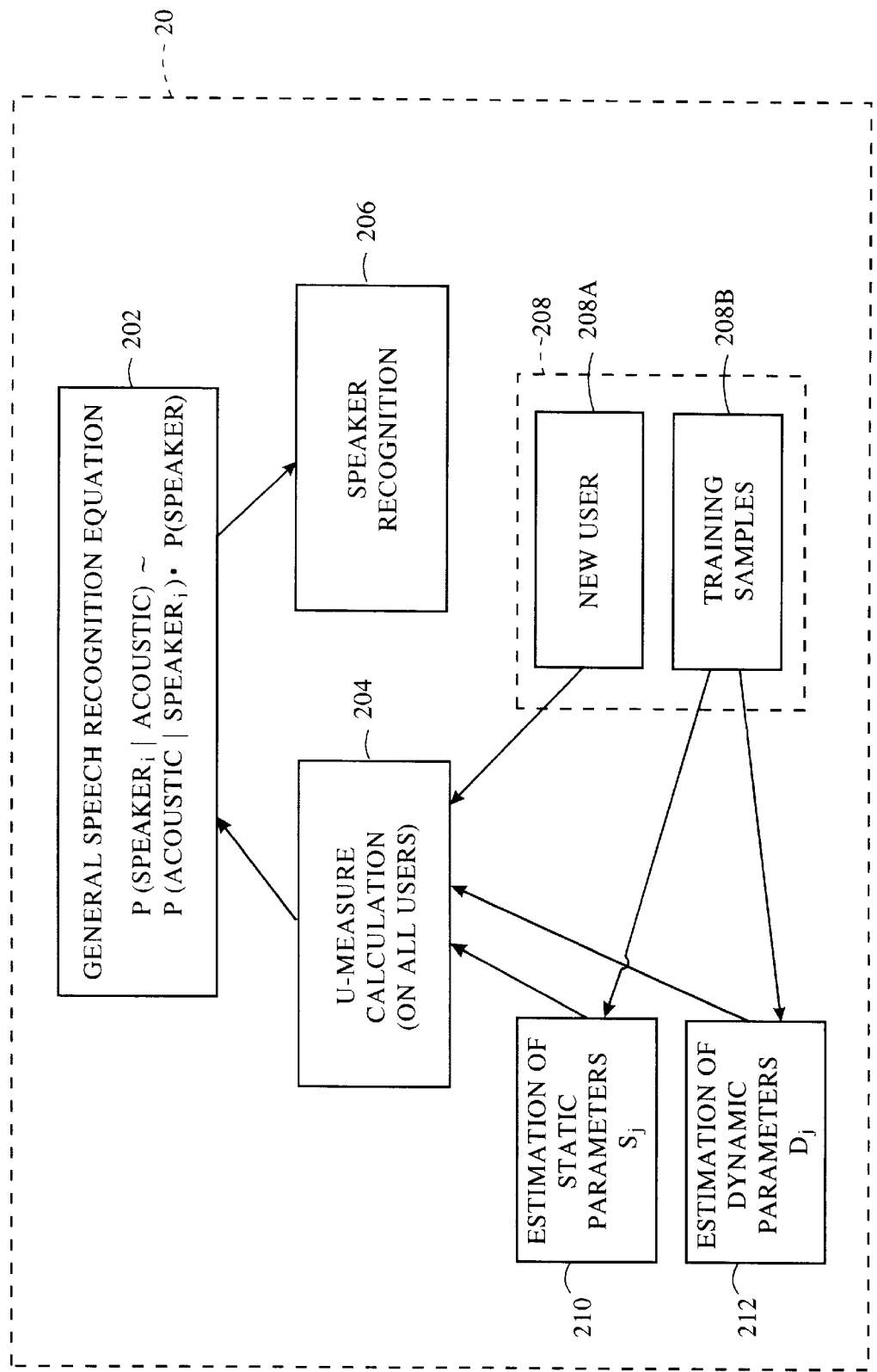
FIG. 5 is a flow chart/block diagram illustrating the generation of a user model according to the invention.

Referring now to FIG. 5, a flow chart/block diagram illustrating the generation of user model 20, formed according to the invention, is shown. As previously explained, a user model is employed to estimate a probability of a particular user's identity. The model is utilized in accordance with the text-independent speaker recognition module 52 (FIG. 2) and the voice classification module 68 (FIG. 3). It is to be appreciated that the static and dynamic information utilized in the models is usually distinct from any other information provided and utilized in response to the random questions, but this is not a necessary condition.

The user information that was described with respect to FIG. 4 may be advantageously used to generate a model of users in order to enhance the text-independent speaker recognition process performed by module 52 (FIG. 2) and the voice classification process performed by module 68 (FIG. 3). It is to be understood that such a model does not produce a user's acoustic score but rather estimates a probability of a given user's identity from a known user's database. In one particular form, one can interpret a search of a best matching speaker with respect to acoustic data as a maximum value of a function defined as the conditional probability of a speaker (speaker$_i$) given the acoustic data utilized from the speaker dialog, i.e., P(speaker$_i$|acoustic data). It is generally known in speech recognition that such a conditional probability may be computed by converting such equation to P(acoustic data|speaker$_i$) P(speaker$_i$). This general speech recognition equation is designated as block 202 in FIG. 5. It is further to be understood that P(acoustic data|speaker$_i$) may be computed using some acoustic models for speakers that may be represented as Hidden Markov Models (HMM). In another embodiment, one can interpret P(speaker$_i$) as a weighted factor and update a general speaker score using a known formula.

As long as there is a satisfactory U-measure (block 204) on a user database, one can apply the strategy used in speech recognition to reduce the size of short lists of speakers and exclude speakers from the acoustic recognition process as long as their U-measure is below some predetermined threshold value. U-measure calculation is a statistical measure on a set of users. The term "U-measure" simply refers to a user measure or a measure on a user population. The measure may be any standard statistical measure on some set of events. In the context of the invention, the events are that some users from a set of users will try to access a service and/or facility. The measure on the set is used to derive a probability that some event or set of events may occur. A standard reference of probabilistic measure on some set may be found in the reference: Encyclopedia of Mathematics, Vol. 6, Kluwer Academic Publishers, edited by M. Hazewinkel, London (1990).

In order to estimate the U-measure for all users in the database, one can use one of the following procedures. First, one may introduce some static parameters (features) that characterize system users, i.e. profession, sex, hobby, etc., and denote them as S1, S2, S3, . . . S$_j$. Likewise, dynamic parameters (features) may be introduced, i.e. age, time when a person attempts to access the service/facility, location from which the caller is calling, etc. and denote them as D1, D2, D3, . . . D$_k$. Now, one can estimate P(S$_j$|D$_k$) from training samples (block 208$b$) for some users within the overall user database (208). The estimation of the static parameters S$_j$ and dynamic parameters D$_k$ are respectively done in blocks 210 and 212. Then, for any new user (block 208$a$), one can estimate his U-score, such as the product of all P(S$_j$|D$_k$) where S$_j$ are taken from the new user's database.

Additional special parameters can be introduced in the set S$_j$. Such parameters may be vocabulary, prosody, speech rate, accent, etc. Essentially, this data can be obtained from the acoustic front-end of the automatic speech recognizer prior to speech recognition.

Other measures which represent the probability of a speaker given a parameter, including more complex models, may be employed and, as a result, the invention is not limited to the use of a U-measure of the static and dynamic parameters described herein.

In addition, the speaker identity claim can be done automatically via a speech and speaker recognition process. At the beginning of the conversation between the user and the central server, the speaker will provide his name and some information such as his address or the object of his request. An acoustic front-end in the speech recognizer (such as ASR 28 in FIG. 2) extracts the acoustic features associated with these first spoken utterances. The utterances are recognized and processed by a natural language understanding module within the speech recognizer in order to identify the name of the user and the address, if available. The stream of acoustic features are also fed to a text-independent speaker recognition module (such as module 52 in FIG. 2) which provides the system with a list of potential users. By searching for matches between the recognized name and the top-ranked identified speakers, the identity claim is obtained. Alternatively, the recognition of the name reduces the population of candidates to a subset, namely, the set of speakers with the same name. Then, the speaker identification process establishes the correct identity claim. Similarly, the requested service may be automatically recognized and different levels of security or tolerance may be established based on the type of request. Also, both approaches may be combined. The system may recognize the name and address of the speaker; however, recognition and/or understanding errors may occur and/or a list of speakers with the same name/address may exist. Thus, by using speaker recognition (preferably, text-independent) on the same data, the list of candidates may be reduced to a small number or to one particular user. If a substantial set of candidates still exist, random questions may be used to decide who the speaker is before going through the verification process.

The advantage of having a text-independent speaker recognition engine is apparent when the actual service is provided. The stream of acoustic features fed to the speech recognition engine and its natural language understanding module may also be fed to the text-independent speaker recognition module which runs in the background and verifies that over the whole interaction, using a large amount of test data, that the speaker verification still matches. Advantageously, problems can be flagged and depending on the service, the service may be interrupted or an operator may be called or a subsequent verification may be requested whereby the transaction is temporarily put on hold until the re-verification is accomplished.

The following is one example of an implementation of the speaker verification principles described herein. However, it is to be appreciated that the present invention is not limited to this particular example and that one of ordinary skill in the art will contemplate many other implementations given the teachings described herein.

The feature vectors (obtained as an output of the acoustic front-end of the speech recognizer) are of the mel cepstral, delta and delta—delta type (including C0 energy). These feature vectors are 39 dimension vectors and are computed on frames of about 25 milliseconds with shifts of about 10 milliseconds. It is to be appreciated that the speaker recognition module and the speech recognizer may use the same types of feature vectors; however, this is not critical to the invention. The speaker identifier is a vector quantizer which stores, during enrollment, a minimum of information about each speaker. All the input feature vectors are clustered in a set of about 65 codewords. Typically, about 10 seconds of speech are required for enrollment. This is easily obtained as the new user enrolls all of his aliases. However, when the user interacts with the system rather than for the purpose of enrolling his aliases, data obtained may be used to build acoustic models of the voice prints. In practice, all the data from the user enrollment is used. Note that when a new speaker is enrolled, it does not affect any of the previous models.

When an enrolled speaker uses the system, the acoustic features are computed and simultaneously given to the speaker identification system and to the speech recognizer. The speaker identification/verification/classification phase is implemented as a vector quantizer decoder. On a frame by frame basis, it identifies the closest codebook (or ranks the N closest codebooks). An histogram is created which counts how many frames have been selected for each codebook. The codebook which is most often selected identifies the potential speaker. By looking at the average distance from the closest codebook, it is possible to detect new users. In this case, the new user is then prompted with an enrollment menu in order to perform the enrollment process.

Different embodiments may be employed for the text-independent speaker verifier. Again, the feature vectors (obtained as the output of the acoustic front-end) are of the mel cepstral, delta, and delta—delta type (including C0 energy). They are preferably 39 dimension vectors and are computed at the user end or at the server end. The features are usually computed on frames of about 25 milliseconds with shifts of about 10 milliseconds. The speaker verifier is preferably a vector quantizer which stores, during enrollment, a minimum of information about each speaker. All the input feature vectors are clustered in a set of about 65 codewords (centroids and variances). Typically, about 10 seconds of speech are required for enrollment. The speaker verification phase is implemented as a vector quantizer decoder. On a frame by frame basis, the closest codebook is identified or the N closest codebooks are ranked. An histogram is created which counts how many frames have selected each codebook. The codebook which is most selected identifies the potential speaker. Acceptance or rejection of test speakers is based on the average distance from the codebooks of the testing vectors versus the average variance of the codebook provided that the identified speaker matches the identity claim and by comparing the scores to the scores obtained from "cohorts" of the speaker as described in U.S. Ser. No. 08/788,471. Cohorts are sets of similarly sounding speakers who are in the database. The verification results from a competition between the speaker model and the models of the cohorts or background (new model built over the whole cohort group) models. The identity claim is tried over all the users who have access to the function protected by the system. The speaker classification is performed by doing identification with models obtained by clustering close codebooks associated with similar speakers.

It is to be appreciated that, in order to implement the embodiments described herein, various existing components may be implemented. For instance, a speech recognizer (such as shown as ASR 28 in FIG. 2 and speaker-independent ASR 60 in FIG. 3) may be implemented using a classical large vocabulary speech recognition engine using Hidden Markov Models, mixtures of Gaussian probabilities, mel cepstral vectors as acoustic features, a 20K or 64K vocabulary and a trigram language model. Such systems, for example, are disclosed in IBM's speech dictation engine "Simply Speaking" and in "Transcription of Radio Broadcast News with the IBM Large Vocabulary Speech Recognition System", P. S. Goplalakrishnan et al., Proceeding Speech Recognition Workshop, Arden House, Drapa (1996). Further, while it is preferred that a text-independent speaker recognition module (module 52 of FIG. 2) is utilized, text-dependent or text-prompted speaker recognition modules may also be used. Such systems are described in the Furui article (text-dependent speaker recognition) and in U.S. Ser. No. 08/788,471 (text-independent speaker recognition). Preferably, a natural language understanding module which relies on a combination of classical parsing capabilities with key word spotting and speech recognition may be employed, such as disclosed in the article "Statistical Natural Language Understanding Using Hidden Clumpings", M. Epstein et al., ICASSP Proceedings, pg. 176, Vol. 1, (1996). However, other methods of implementing natural language understanding may be employed.

Furthermore, a voice classification module such as is disclosed in either U.S. Ser. No. 08/787,031 or the patent application (IBM Docket No. Y0996-189) entitled, "Speaker Recognition Over Large Population with Combined Fast and Detailed Matches", filed on May 6, 1997, may be employed to perform the functions of the voice classification module 68. A score estimator such as is disclosed in U.S. Pat. No. 5,502,774 (Bellegarda et al.) may be employed to perform the functions of the score estimator 44. A semantic analyzer as is disclosed in either of the articles: G. Gazdar and C. Mellish, Natural Language Processing in PROLOG—An Introduction to Computational Linguistics (1989); P. Jacobs and L. Rau, Innovation in Text Interpretation, Artificial Intelligence, Vol. 63, pg. 143–191 (1993); W. Zadrozny et al., "Natural Language Understanding with a Grammar of Constructions", Proceedings of the International Conference on Computational Linguistics (August 1994).

Although the illustrative embodiments of the present invention have been described herein with reference to the accompanying drawings, it is to be understood that the invention is not limited to those precise embodiments, and that various other changes and modifications may be affected therein by one skilled in the art without departing from the scope and spirit of the invention.

What is claimed is:

1. A method of controlling access of a speaker to one of a service and a facility, the method comprising the steps of:
   (a) receiving first spoken utterances of the speaker, the first spoken utterances containing indicia of the speaker;
   (b) decoding the first spoken utterances;
   (c) accessing a database corresponding to the decoded first spoken utterances, the database containing information attributable to a speaker candidate having indicia substantially similar to the speaker;
   (d) querying the speaker with at least one question based on the information contained in the accessed database;
   (e) receiving second spoken utterances of the speaker, the second spoken utterances being representative of at least one answer to the at least one question;
   (f) decoding the second spoken utterances;
   (g) verifying the accuracy of the decoded answer against the information contained in the accessed database serving as the basis for the question;
   (h) taking a voice sample from the utterances of the speaker and processing the voice sample against an acoustic model attributable to the speaker candidate;
   (i) generating a score corresponding to the accuracy of the decoded answer and the closeness of the match between the voice sample and the model; and
   (j) comparing the score to a predetermined threshold value and if the score is one of substantially equivalent to and above the threshold value, then permitting speaker access to one of the service and the facility.

2. The method of claim 1, further comprising the step of one of denying access to the speaker and repeating the process if the score is not substantially equivalent to and not above the threshold value.

3. The method of claim 1, wherein the acoustic model attributable to the speaker is not previously available and the method further comprising the steps of:
(a) querying the speaker with a plurality of questions based on the information contained in the accessed database; and
(b) building the acoustic model from voice samples taken from a plurality of answers provided by the speaker in response to the plurality of questions.

4. The method of claim 1, wherein the indicia in the first spoken utterances includes identifying indicia.

5. The method of claim 1, wherein the indicia in the first spoken utterances includes verifying indicia.

6. The method of claim 1, wherein at least a portion of the information contained in the database is one of acoustic and non-acoustic information.

7. The method of claim 1, wherein at least a portion of the information contained in the database is derived from spoken utterances provided by the speaker prior to the decoding step.

8. The method of claim 1, wherein at least a portion of the information contained in the database is derived from decoded spoken utterances provided by the speaker.

9. The method of claim 1, wherein at least a portion of the information in the database has static features.

10. The method of claim 1, wherein at least a portion of the information in the database has dynamic features.

11. The method of claim 1, wherein the sub-step of processing the voice sample against the acoustic model is performed by a text-independent speaker recognition technique.

12. The method of claim 1, further comprising the step of requerying the at least one question if the at least one answer is not accepted during the decoding step.

13. The method of claim 1, wherein the steps of the method of controlling access of the speaker forms a speech biometric.

14. The method of claim 1, wherein one of the database and the model may be built through pre-enrollment of the speaker.

15. The method of claim 1, wherein one of the database and the model may be one of built and updated automatically during the method of controlling access of the speaker to one of the service and the facility.

16. The method of claim 1, wherein at least a portion of the at least one answer provided by the speaker is in a form other than speech.

17. The method of claim 1, wherein the sub-step of processing the voice sample against the acoustic model is performed on a random question.

18. The method of claim 1, wherein at least a portion of the information contained in the database comprises non-acoustic information corresponding to the speaker candidate, the non-acoustic information originating from a source other than the speaker candidate, the method further comprising the steps of:
verifying the accuracy of the non-acoustic information contained in the database against corresponding non-acoustic information obtained during the control of access of the speaker to one of the service and the facility;
generating a second score corresponding to the accuracy of the verification; and
combining the second score with the score corresponding to the accuracy of the decoded answer and the closeness of the match between the voice sample and the model, before said comparing step.

19. A method of controlling access of a speaker to one of a service and a facility from among a multiplicity of speaker candidates, the method comprising the steps of:
(a) receiving first spoken utterances of the speaker, the first spoken utterances containing indicia of the speaker;
(b) decoding the first spoken utterances;
(c) generating a sub-list of speaker candidates that substantially match the speakers decoded spoken utterances;
(d) activating databases respectively corresponding to the speaker candidates in the sub-list, the databases containing information respectively attributable to the speaker candidates;
(e) performing a voice classification analysis on voice characteristics of the speaker;
(f) eliminating speaker candidates who do not substantially match these characteristics;
(g) querying the speaker with at least one question that is relevant to the information in the databases of speaker candidates remaining after the step (f);
(h) further eliminating speaker candidates based on the accuracy of the answer provided by the speaker in response to the at least one question;
(i) further performing the voice classification analysis on the voice characteristics from the answer provided by the speaker;
(j) still further eliminating speaker candidates who do not substantially match these characteristics; and
(k) iteratively repeating steps (g) through (j) until one of one speaker candidate and no speaker candidates remain, if one speaker candidate remains then permitting the speaker access and if no speaker candidate remains then denying the speaker access.

20. The method of claim 19, wherein the first spoken utterances of the speaker are also representative of a password which is shared by a sub-set of the multiplicity of speaker candidates.

21. The method of claim 19, wherein the indicia in the first spoken utterances includes identifying indicia.

22. The method of claim 19, wherein the indicia in the first spoken utterances includes verifying indicia.

23. The method of claim 19, wherein at least a portion of the information contained in the database is one of acoustic and non-acoustic information.

24. The method of claim 19, wherein at least a portion of the information contained in the database is derived from spoken utterances provided by the speaker prior to the decoding step.

25. The method of claim 19, wherein at least a portion of the information contained in the database is derived from decoded spoken utterances provided by the speaker.

26. The method of claim 19, wherein at least a portion of the information in the database has static features.

27. The method of claim 19, wherein at least a portion of the information in the database has dynamic features.

28. The method of claim 19, wherein the steps of performing voice classification analysis are performed by a text-independent voice classification.

29. The method of claim 19, further comprising the step of requerying the at least one question if the at least one answer is not accepted during the decoding step.

30. The method of claim 19, wherein the steps of the method of controlling access of the speaker forms a speech biometric.

31. The method of claim 19, wherein one of the database and the model may be built through pre-enrollment of the speaker.

32. The method of claim 19, wherein one of the database and the model may be one of built and updated automatically during the method of controlling access of the speaker to one of the service and the facility.

33. The method of claim 19, wherein at least a portion of the at least one answer provided by the speaker is in a form other than speech.

34. The method of claim 19, wherein the steps of processing the voice sample against the acoustic model are performed on a random question.

35. The method of claim 19, wherein at least a portion of the information contained in the databases comprises non-acoustic information corresponding to the speaker candidates, the non-acoustic information originating from sources other than the speaker candidates, the method further comprising the steps of:

verifying the accuracy of the non-acoustic information contained in the databases against corresponding non-acoustic information obtained during the control of access of the speaker to one of the service and the facility; and yet further eliminating speaker candidates based on the accuracy of the verification.

36. Apparatus for controlling access of a speaker to one of a service and a facility, the apparatus comprising:

means for receiving first spoken utterances of the speaker, the first spoken utterances containing indicia of the speaker;

means for decoding the first spoken utterances;

means for accessing a database corresponding to the decoded first spoken utterances, the database containing information attributable to a speaker candidate having indicia substantially similar to the speaker;

means for querying the speaker with at least one question based on the information contained in the accessed database;

means for receiving second spoken utterances of the speaker, the second spoken utterances being representative of at least one answer to the at least one question;

means for decoding the second spoken utterances;

means for verifying the accuracy of the decoded answer against the information contained in the accessed database serving as the basis for the question;

means for taking a voice sample from the utterances of the speaker and processing the voice sample against an acoustic model attributable to the speaker candidate;

means for generating a score corresponding to the accuracy of the decoded answer and the closeness of the match between the voice sample and the model; and means for comparing the score to a predetermined threshold value and if the score is one of substantially equivalent to and above the threshold value, then permitting speaker access to one of the service and the facility.

37. The apparatus of claim 36, wherein at least a portion of the information contained in the database comprises non-acoustic information corresponding to the speaker candidate, the non-acoustic information originating from a source other than the speaker candidate, the apparatus further comprising:

means for verifying the accuracy of the non-acoustic information contained in the database against corresponding non-acoustic information obtained during the control of access of the speaker to one of the service and the facility;

means for generating a second score corresponding to the accuracy of the verification; and means for combining the second score to the score corresponding to the accuracy of the decoded answer and the closeness of the match between the voice sample and the model.

38. Apparatus for controlling access of a speaker to one of a service and a facility from among a multiplicity of speaker candidates, the apparatus comprising:

means for receiving first spoken utterances of the speaker, the first spoken utterances containing indicia of the speaker;

means for decoding the first spoken utterances;

means for generating a sub-list of speaker candidates that substantially match the speakers decoded spoken utterances;

means for activating databases respectively corresponding to the speaker candidates in the sub-list, the databases containing information respectively attributable to the speaker candidates;

means for performing a voice classification analysis on voice characteristics of the speaker;

means for eliminating speaker candidates who do not substantially match these characteristics;

means for querying the speaker with at least one question to the speaker that is relevant to the information in the databases of speaker candidates remaining after elimination by the eliminating means;

means for further eliminating speaker candidates based on the accuracy of the answer provided by the speaker in response to the at least one question;

means for further performing the voice classification analysis on the voice characteristics from the answer provided by the speaker;

means for still further eliminating speaker candidates who do not substantially match these characteristics; and means for iteratively repeating the querying and voice classification analysis procedures until one of one speaker candidate and no speaker candidate remains, if one speaker candidate remains then permitting the speaker access and if no speaker candidate remains then denying the speaker access.

39. The apparatus of claim 38, wherein at least a portion of the information contained in the databases comprises non-acoustic information corresponding to the speaker candidates, the non-acoustic information originating from sources other than the speaker candidates, the apparatus further comprising:

means for verifying the accuracy of the non-acoustic information in the databases against corresponding non-acoustic information obtained during the control of access of the speaker to one of the service and the facility; and means for yet further eliminating speaker candidates based on the accuracy of the verification.

* * * * *